US010212725B1

United States Patent
Pawar et al.

(10) Patent No.: US 10,212,725 B1
(45) Date of Patent: Feb. 19, 2019

(54) SYSTEMS AND METHODS FOR PRIORITIZING WIRELESS DEVICE SELECTION FOR COORDINATED MULTIPOINT (COMP)

(71) Applicant: Sprint Spectrum LP, Overland Parkk, KS (US)

(72) Inventors: Hemanth Pawar, Brambleton, VA (US); Shilpa Kowdley, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/992,706

(22) Filed: May 30, 2018

Related U.S. Application Data

(63) Continuation of application No. 15/071,387, filed on Mar. 16, 2016, now Pat. No. 10,015,811.

(51) Int. Cl.
*H04W 72/12* (2009.01)
*H04B 7/155* (2006.01)

(52) U.S. Cl.
CPC .... *H04W 72/1242* (2013.01); *H04B 7/15507* (2013.01); *H04W 72/1252* (2013.01)

(58) Field of Classification Search
CPC .......... H04W 72/1242; H04W 72/1252; H04B 7/15507
See application file for complete search history.

(56) References Cited

U.S. PATENT DOCUMENTS

| | | | |
|---|---|---|---|
| 2010/0214964 A1* | 8/2010 | Larsson | H01Q 3/2605 370/277 |
| 2012/0093064 A1 | 4/2012 | Horiuchi | |
| 2012/0140699 A1 | 6/2012 | Seo | |
| 2013/0343301 A1 | 12/2013 | Geirhofer et al. | |
| 2014/0056209 A1* | 2/2014 | Park | H04W 16/26 370/315 |
| 2014/0146739 A1 | 5/2014 | Zhang et al. | |
| 2015/0138991 A1* | 5/2015 | Timariu | H04W 52/0229 370/241 |
| 2017/0041942 A1 | 2/2017 | Wallentin | |
| 2017/0126306 A1 | 5/2017 | Kim | |
| 2018/0227948 A1* | 8/2018 | Lu | H04B 7/15507 |

FOREIGN PATENT DOCUMENTS

WO 2014/062104 A1 4/2014

* cited by examiner

*Primary Examiner* — Duc C Ho

(57) ABSTRACT

Systems and methods are described for coordinating transmissions from a multiple access nodes in a communication network. A relay-capable status of wireless devices connected to an access node may be determined. Relay capable wireless devices are dynamically selected from the connected wireless devices for assignment of coordinated transmissions from an access node. Scheduling between the selected relay capable wireless devices and the access node is conducted.

20 Claims, 7 Drawing Sheets

| WD STATUS | | COMP PRIORITIATION AND ASSIGNMENT | | |
|---|---|---|---|---|
| WD | RELAY? | NUMBER OF WD CONNECTED TO RELAY WD | COMP ENABLED? | MAXIMUM COMP SECONDARY SERVERS ALLOWED |
| A | N | 0 | N | 0 |
| B | Y | 2 | Y | 3 |
| C | N | 0 | N | 0 |
| D | N | 0 | N | 0 |
| E | Y | 3 | Y | 4 |

SYSTEMS AND METHODS FOR PRIORITIZING WIRELESS DEVICE SELECTION FOR COORDINATED MULTIPOINT (COMP)

This patent application is a continuation of U.S. patent application Ser. No. 15/071,387, filed on Mar. 16, 2016, which is incorporated by reference in its entirety for all purposes.

TECHNICAL BACKGROUND

As wireless networks evolve, the demand for high Quality of Service ("QoS") coupled with, for example, a shortage of wireless spectrum, makes it challenging for network operators to meet user demand. One approach, in Heterogeneous Networks ("HetNet"), is exploitation of Relay Nodes ("RNs"), e.g., low-power nodes, at cell-edges, "hotspots," or coverage "holes" of the network to boost spatial coverage and/or cell-edge capacity. But, RNs may be constrained by backhaul capacity and/or resource allocation techniques of donor access nodes ("DeNBs"), which may undesirably limit an ability of the RNs to effectively service end-users.

In another approach, wireless networks may implement Coordinated Multipoint ("CoMP"), a wireless technology based on network Multiple-Input-Multiple-Output ("MIMO"), to coordinate resource allocation techniques and/or reuse between neighboring DeNBs. For example, in CoMP a group of DeNBs cooperate on a per Transmission Time Interval ("TTI") basis, for example, using Coordinated Scheduling and Beamforming ("CS/CB") or Joint Processing ("JP"), which are exploited, particularly at cell-edges, to provide increased channel quality and/or high QoS to select users.

Under a typical CoMP scheme, non-RN users located at, for example, cell-edges, "hotspots," or coverage "holes" of DeNBs, may be prioritized for CoMP over RNs, limiting the ability of the RNs to provide high QoS to end-users. Because RNs support multiple end-users, it is desirable to prioritize CoMP treatment based on a "relay" status of the user to improve overall QoS of the wireless network.

OVERVIEW

Systems and methods are described for enabling coordinated transmissions from a plurality of access nodes to a selected wireless device. In one instance, a relay-capable status of a plurality of wireless devices connected to a first access node is determined. Relay capable wireless devices are dynamically selected from the plurality of connected wireless devices for assignment of coordinated transmissions. Scheduling is coordinated between the selected relay capable wireless device and the access node.

BRIEF DESCRIPTION OF THE DRAWINGS

FIG. 3B illustrates an exemplary table for configuring a communication network for CoMP prioritization and assignment based on relay capability.

DETAILED DESCRIPTION

Figure 1A:
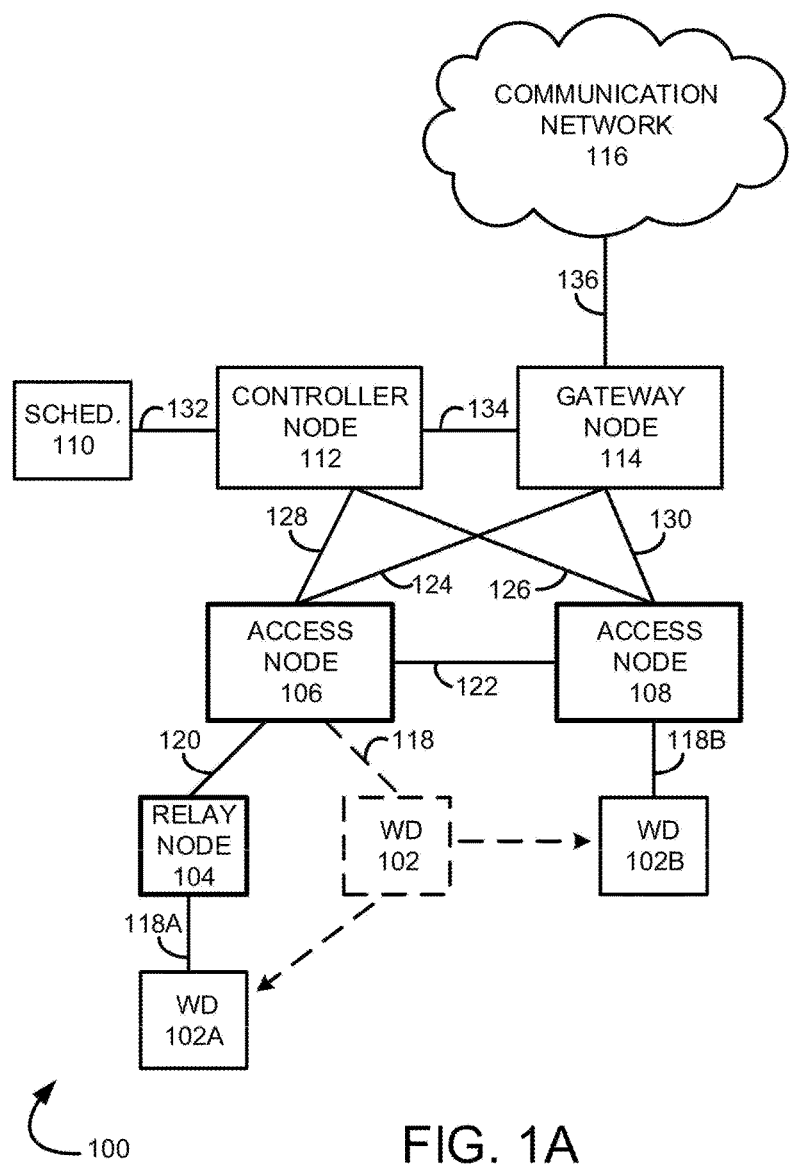
FIG. 1A illustrates an exemplary communication system 100 for prioritizing wireless device selection for Coordinated Multipoint ("CoMP").
Figure 1B:
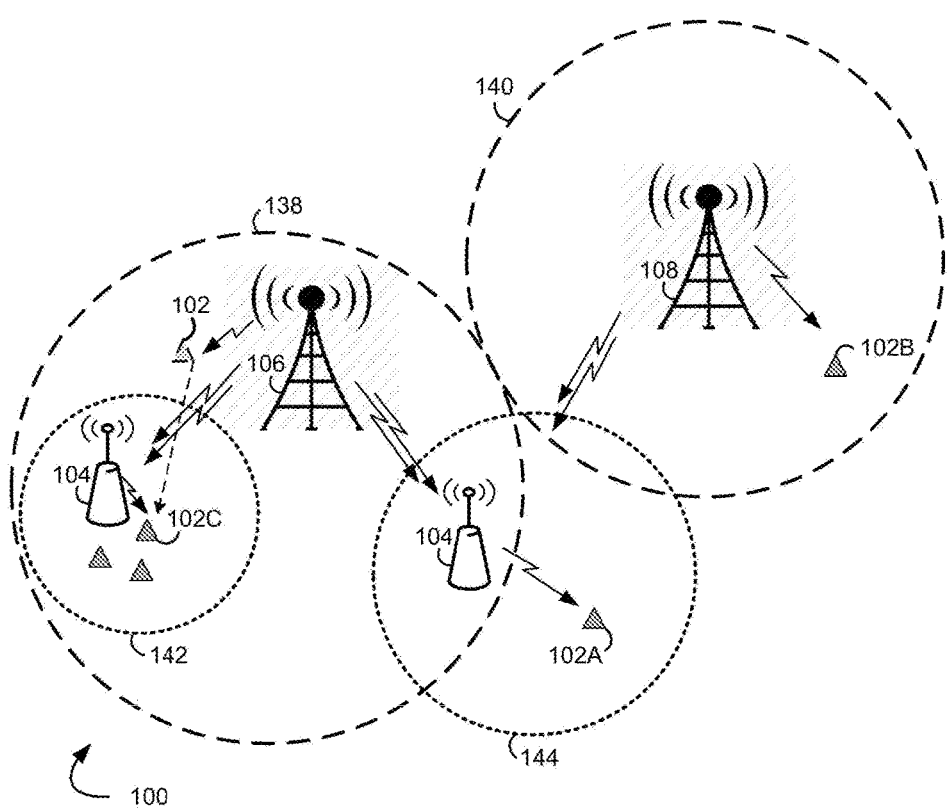
FIG. 1B illustrates a portion of the exemplary system 100 illustrated in FIG. 1A for prioritizing wireless device selection for CoMP.

FIG. 1A illustrates an exemplary communication system 100 for prioritizing wireless device selection for CoMP. FIG. 1B illustrates a portion of the exemplary system 100 illustrated in FIG. 1A for prioritizing wireless device selection for CoMP. In operation, Relay Nodes ("RNs") may be exploited in Heterogeneous Networks ("HetNet") at cell-edges, "hotspots," and/or coverage "holes" of geographical areas 138, 140 of high-powered, large scale access nodes, for example, donor access nodes ("DeNBs") 106, 108, to boost spatial coverage and/or cell-edge capacity. Relay capable wireless devices, for example, Relay Node 104 ("RN 104"), may be configured to serve a plurality of end-users, e.g., wireless devices 102A, 102C, via an in-band and/or out-band over-the-air interface 120 to DeNB 106.

As illustrated in FIGS. 1A and 1B, wireless devices 102, 102A, 102B, 102C operating at cell-edges, "hotspots," and/or coverage "holes" of geographical areas 138, 140 of DeNBs 106, 108 may experience reduced channel capacity, e.g., low Signal-to-Interference-Plus-Noise ("SINN") levels, and/or Quality of Service ("QoS") degradation. Wireless network 116 may instruct DeNBs 106 and/or 108 to select a relay capable wireless device, for example, RN 104, operating at cell-edges, a "hotspot," and/or coverage "hole" of geographic area 138, as illustrated in FIG. 1B, to function as a RN. DeNBs 106 and/or 108 may select RN 104 from multiple relay-capable wireless devices 102, 102B, RN 104 based on, for example, collected Received Signal Strength Indicators ("RSSI") and/or Radio Frequency ("RF") parameters, and establish an over-the-air link, for example, Un interface 120, with RN 104. Once the over-the-air link 120 has been established, e.g., between DeNBs 106 and/or 108 and RN 104, DeNBs 106 and/or 108 can instruct non-relay capable wireless device 102A, 102C operating within a radio range 142, 144 of RN 104, to establish a radio access link, for example, Uu interface 118A, with. For example, RN 104 is configured by DeNBs 106 and/or 108 as an Access Point ("AP") for offload of wireless devices 102A, 102C from DeNBs 106 and/or 108. DeNBs 106 and/or 108 may also establish direct links 118, 118B with wireless devices 102, 102A, 102B, 102C RN 104 operating in the radio range 142, 144 of RN 104 and/or within geographical areas 138, 140 of DeNBs 106, 108.

In one embodiment (not shown), multiple RNs may establish, for example, over-the-air links, e.g., Un interfaces, with each other. DeNBs 106 and/or 108 can establish over-the-air links 120 with RN 104, which can establish an over-the-air link with another RN such that RN 104 acts as an AP another RN and for end-users of that RN.

A number of different classifications for RNs exist. RNs, for example, RN 104, can be Amplify-and-Forward ("AF") relays and/or Decode-and-Forward ("DF") relays. Based on a number of protocol layers implemented, RNs are categorized in three groups: Layer 1 RNs, Layer 2 RNs, and/or Layer 3 RNs. For example, AF relays are Layer 1 ("L1") RNs, which repeat, by amplifying and re-transmitting (e.g., application of same power gain to all signals) received signals on the Physical Layer ("PHY") of the Open Systems Interconnection ("OSI") model, including noise and interference. Because amplification is carried out on a distorted signal, AF relays amplify negative effects of radio-hop. Because of the lack of complex signaling, AF relays are mostly transparent and include negligible relaying delay. This makes them useful for simple coverage extension scenarios.

DF relays are Layer 2 ("L2") RNs. DF relays are sophisticated relays because they do not blindly repeat the whole signal. For example, DF relays include all functionalities of a traditional access node, for example, DeNBs 106, 108, lacking only a fixed connection (e.g., wired backhaul links 124, 128, 134, 136) to the operators core network (e.g., controller node 112, gateway node 114, and/or communication network 116). DF relays establish backhaul links, e.g., Uu interfaces (not shown), dynamically over the radio access link to DeNBs 106 and/or 108, e.g., "self-backhauling." DF relays perform full signal reception and/or retransmission procedures up to, for example, the Transmission Control Protocol ("TCP") stack of the OSI Model. DF relays use signal processing to decode and then re-generate useful signals including: error correction, re-modulation, and re-encoding. DF relays can be used in interference-limited scenarios, for example, to enhance cell-edge performance for wireless devices 102A operating at a cell-edge of geographical areas 138, 140 of DeNBs 106 and/or 108. DF relay signal processing, however, introduces delay, which may decrease QoS for delay sensitive traffic, for example, Voice-Over-IP ("VoIP").

Layer 3 ("L3") RNs are configured with full Radio Resource Control ("RRC") capabilities and comprise all functionalities of DeNBs 106 and/or 108. Layer 3 RNs can communicate with DeNBs 106, 108 through an x2-like interface, e.g., Uu interface 120, or, when not configured as a RN, with DeNBs 106, 108 over a radio access link (e.g., illustrated in FIG. 1A as link 118 to wireless device 102). Layer 3 RNs can receive and forward Internet Protocol ("IP") data packets (e.g., Packet Data Convergence Protocol ("PDCP") service data unites ("SDUs")), where the user packet at the IP layer of the OSI model is viewable at Layer 3 RNs. A unique Physical Cell Identity ("PCI") may be assigned to Layer 3 RNs via the PHY layer of the OSI model, which is different from a PCI assigned to the DeNBs 106 and/or 108.

RNs use of spectrum can be classified as In-band relay or Out-band relay. For example, data packets related to applications running on end-user 102A may be uploaded/downloaded from system 100 on UL and DL portions of radio access link 118A via sub-layers of a User-Plane ("UP") protocol stack. Data packets received at the PDCP layer of the OSI Model are passed to a Radio Link Control ("RLC") layer, to be concatenated or segmented to a correct block size. The RLC layer forwards the concatenated data packets to the Media Access Control ("MAC") layer for transmission by a PHY layer of the UP protocol stack via RN 104 and/or a scheduler module (not shown) based on, for example, a selected modulation and coding scheme ("MCS").

In-band and/or Out-band relay is considered in the PHY layer. In one embodiment, In-band L3 RNs operate on a same frequency carrier and, to avoid self-interference, radio access links 118A and over-the-air link 120 are time-multiplexed, for example, by reusing Multimedia-Broadcast-Over-Single-Frequency-Network ("MBSFN") subframes. For Out-Band L3 RNs, the radio access link 118A to RN 104 and over-the-air link 120 to DeNBs 106 and/or 108 are operated on separate frequency carriers.

RNs 104, operating at, for example, cell-edges, "hotspots," and/or coverage "holes" of geographical areas 138, 140 of DeNBs 106, 108, may continue to experience reduced channel capacity, e.g., low SINR levels, and/or Quality of Service ("QoS") degradation, due to limited backhaul capacity and/or resource allocation techniques of DeNBs 106 and/or 108.

In one embodiment, wireless networks may implement Coordinated Multipoint ("CoMP"), a wireless technology based on Multiple-Input-Multiple-Output ("MIMO"), to coordinate resource allocation and/or reuse between neighboring DeNBs. In CoMP, a group of neighboring access nodes, e.g., DeNBs 106, 108, cooperate on per Transmission Time Interval ("TTI") basis using, for example, Coordinated Scheduling and Beamforming ("CS/BS") or Joint Processing ("JP"), to facilitate cooperative communications across multiple APs. Multiple DeNBs 106, 108 coordinate with each other based on CoMP type, for example, Intra-site CoMP, Inter-site CoMP, HetNet-CoMP, CoMP relay, RRH based CoMP, etc., so that transmission signals to/from other points, e.g., wireless devices 102, 102A, 102B, 102C, RN 104, do not incur serious interference; DeNBs 106, 108 may also coordinate with each other, for example, over x2 interface 122, to exploit interference as a meaningful signal.

CS/CB CoMP schemes, coordinate scheduling and beamforming (e.g., coordination in space domain) among geographically separated access nodes transmitting to wireless devices 102, 102A, 102B, 102C, RN 104, for example, cooperating DeNBs 106, 108, to avoid inter-cell interference. On the DL, data is transmitted to a single wireless device 102, 102A, 102B, 102C, RN 104 located in a geographical area 138, 140 of neighboring DeNBs 106, 108 using a same resource, e.g., the next available PRB, wireless spectrum, etc. Because scheduling decisions and/or beams are coordinated to control interference, DL CS/CB CoMP schemes may be implemented with minimal degradation to SINR and/or QoS. The effect is similar to Multi-User MIMO ("MU-MIMO"), with a difference being that each of the wireless devices 102, 102A, 102B, 102C, RN 104 receives data only from its own DeNB 106, 108.

JP CoMP schemes, in contrast to CS/CB CoMP schemes, leverage inter-cell interference of neighboring DeNBs 106, 108. On the DL, data to wireless devices 102, 102A, 102B, 102C, RN 104 may be transmitted simultaneously from a number of different DeNBs 106 and/or 108 to improve RSSI and/or to actively cancel interference from transmissions intended for other wireless devices 102, 102A, 102B, 102C, RN 104. In Dynamic Cell Selection ("DCS") JP CoMP, only one DeNB 106 transmits resources, e.g., the next available PRB, wireless spectrum, etc., to a wireless device 102, 102A, 102B, 102C, RN 104 at a time, but the transmitting DeNB 106 and/or 108 may be selected for each TTI (e.g., split scheduling). In Joint Transmission ("JT") JP CoMP, both DeNBs 106 and/or 108 transmit resources, e.g., next available PRB and/or wireless spectrum, to a single wireless device 102, 102A, 102B, 102C, RN 104 at each TTI, creating a virtual MIMO effect. Because of this, multiple wireless devices 102, 102A, 102B, 102C, RN 104 can be served per resource element ("RE"), e.g., virtual MU-MIMO. On the UL, multiple antennas at different CoMP cells, e.g., antennas at DeNBs 106, 108, are coordinated to form a virtual antenna array and output a combined signal.

Both CS/CB and JP CoMP schemes require provision of accurate and detailed Channel State Information ("CSI"). The CSI data is required for all links, e.g., links 118, 118A, 118B, 120, between wireless devices 102, 102A, 102B, 102C, RN 104 and DeNBs 106, 108 in a CoMP set (e.g., DeNBs 106, 108), which may impose high requirements on the capacity and reliability of interfaces, for example, x2 interface 122, interconnecting cooperating DeNBs 106 and/ or 108. In DL CS/CB CoMP, requirements for coordination across the backhaul network are considerably reduced because: wireless device 102, 102A, 102B, 102C, RN 104 data does not need to be transmitted from multiple DeNBs 106 and/or 108 and, therefore, only needs to be directed to a single DeNB 106 or 108; and, only the scheduling decisions and details of beams need to be coordinated between DeNBs 106 and 108. On the UL, only scheduling data needs to be transferred between coordinating DeNBs 106 and 108. But, in JP CoMP, high demand is placed onto the backhaul network because data to be transmitted to wireless devices 102, 102A, 102B, 102C, RN 104 must be sent to each DeNB 106 and 108 that will be transmitting data to the wireless devices 102, 102A, 102B, 102C, RN 104. Depending on a number of DeNBs 106 and/or 108 and/or RNs 104 sending data to wireless devices 102, 102A, 102B, 102C, RN 104, network overhead may increase.

CoMP cells, e.g., DeNBs 106, 108, may initially target cell-edge, "hotspot," and/or coverage "hole" wireless devices 102, 102A, 102B, 102C, RN 104, illustrated in FIG. 1B, to be subjected to CS/CB and/or JP CoMP. For example, because CoMP schemes are concerned with improving RSSI, wireless device 102, 102A, 102B, 102C, RN 104 selection criteria is based on SINR and/or RF parameters, which are lowest at cell-edges, "hotspots," and/or coverage "holes" of geographical areas 138, 140 of DeNBs 106, 108. This is, in part, because those wireless devices 102, 102A, 102B, 102C, RN 104 experience interference. Thus, under a typical CoMP scheme, a non-RN wireless device 102, 102A, 102B, 102C located at a cell-edge of geographical area 138, 140, e.g., attempting to establish a direct link 118, 118B with DeNBs 106 and/or 108, may be prioritized over RN 104, which supports multiple end-users 102A, 102C. If priority CoMP treatment, e.g., scheduling the next available PRB and/or allocating wireless spectrum, is allotted only based on SINR and/or RF parameters, end-users 102A, 102C of RN 104 may experience reduced channel capacity, e.g., low SINR levels, and/or Quality of Service ("QoS") degradation. Because RNs 104 support a plurality of end-users 102A, 102C it is desirable to prioritize CoMP treatment, e.g., for scheduling the next available PRB and/or allocating wireless spectrum, based on a "relay" status of the wireless device 102, 102A, 102B, 102C, RN 104 to improve overall QoS of the system 100.

Communication system 100 comprises relay capable wireless devices 102, 102A, 102B, 102C, RN 104, DeNBs 106 and 108, scheduler 110, controller node 112, gateway node 114, and communication network 116. Other network elements may be present in the communication system 100 to facilitate communication, but are omitted for clarity, such as controller nodes, base stations, base station controllers, gateways, mobile-switching centers, dispatch application processors, and location registers such as a Home Location Register ("HLR") or Visitor Location Register ("VLR"). Furthermore, other network elements may be present to facilitate communication between DeNBs 106 and/or 108 and communication network 116, which are omitted for clarity, including additional processing nodes, routers, gateways, and physical and/or wireless data links for carrying data among the various network elements.

Wireless devices 102, 102A, 102B, 102C, RN 104 can be any device configured to communicate over system 100 using a wireless interface. For example, wireless devices 102, 102A, 102B, 102C, RN 104 can include a Remote Terminal Unit ("RTU"), a cell phone, a smart phone, a computing platform such as a laptop, palmtop, or a tablet, a Personal Digital Assistant ("PDA"), or an internet access device, and combinations thereof. It is noted that while two wireless devices are illustrated in FIG. 1A as being in communication with RN 104 and/or DeNBs 106, 108, any number of wireless devices can be implemented according to various exemplary embodiments disclosed herein.

The wireless interface of wireless devices 102, 102A, 102B, 102C, RN 104 can include, for example, one or more transceivers for transmitting and receiving data over communication system 100. Each transceiver can be associated with the same or different frequency bands, the same or different radio access technologies, the same or different network providers, and/or the same or different services. For example, wireless devices 102, 102A, 102B, 102C, RN 104 can include a transceiver that is associated with one or more of the following: Code Division Multiple Access ("CDMA") 1×RTT, Global System for Mobile communications ("GSM"), Worldwide Interoperability for Microwave Access ("WiMAX"), Universal Mobile Telecommunications System ("UMTS"), Evolution Data Optimized ("EV-DO"), EV-DO rev. A, Third Generation Partnership Project Long Term Evolution ("3GPP LTE"), and/or High-Speed Downlink Packet Access ("HSDPA"), IEEE 802.11, Wireless Fidelity ("Wi-Fi"), Bluetooth, Zigbee, Infrared Data Association ("IrDA"), Multimedia Broadcast Multicast Service ("MBMS"), etc.

Wireless devices 102, 102A, 102B, 102C, RN 104 can be in communication with DeNBs 106 and/or 108 through communication links 118, 118A, 118B, 120. Communication links 118, 118A, 118B, 120 can use various communication media, such as air, space, metal, optical fiber, or some other signal propagation path—including combinations thereof. The communication links 118, 118A, 118B, 120 may comprise many different signals sharing the same link and could include, for example, multiple signals operating in a single "air-path" comprising beacon signals, user communications, communication sessions, overhead communications, frequencies, timeslots, transportation ports, logical transportation links, network sockets, packets, or communication directions. For example, user communications between wireless device 102 and DeNB 106 could share the same representative wireless link, but be transferred over different communication sessions, frequencies, timeslots, packets, ports, sockets, logical transport links, or in different directions, including combinations thereof.

Wireless devices 102, 102A, 102B, 102C, RN 104 can transmit and/or receive information over communication system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, news alerts, etc.

Relay capable wireless devices 102, 102B, RN 104 can be any network node capable of providing wireless communications to wireless devices 102, 102A, 102B, 102C, RN 104 and can be, for example, a mobile network base station (e.g., wireless device, PICO node, FEMTO node, RRH, etc.) configured to connect to DeNBs 106 and/or 108 and/or communication network 116 using a wired or wireless interface. For example, in one embodiment, RN 104 may be configured to connect to DeNBs 106 and/or 108 via an In-band/Out-band over-the-air backhaul link 120 and/or a dedicated wired (e.g., Ethernet) or wireless (e.g., microwave) backhaul link. Link 120 can comprise, for example, RF, microwave, infrared, or other similar signal, and can use a suitable communication protocol, for example, CDMA 1×RTT, GSM, WiMAX, UMTS, EV-DO, EV-DO rev. A, 3GPP LTE, HSDPA, IEEE 802.11, Wi-Fi, IrDA, or combinations thereof. RN 104 may provide Coverage Range Extension ("CRE") to regions of high shadowing (including indoor areas) or locations where dedicated backhaul links are not (or cannot be) deployed. Although one RN 104 is illustrated in FIG. 1A as being in communication with DeNB 106, any number of RNs can be implemented according to various exemplary embodiments disclosed herein.

DeNBs 106 and 108 can be any network node capable of providing wireless communications to wireless devices 102, 102A, 102B, 102C, RN 104 and can be, for example, a Base Transceiver Station ("BTS"), a radio base station, an eNodeB device, or an enhanced eNodeB device. DeNBs 106 and/or 108 can include a scheduler module (not shown) or can be in communication with scheduler node 110, illustrated in FIG. 1A. DeNBs 106, 108 can use scheduler module (not shown) and/or scheduler node 110 to dynamically coordinate/allocate resources, e.g., the next available PRB, wireless spectrum, etc., to wireless devices 102, 102A, 102B, 102C, RN 104 located in geographical areas 138, 140. Scheduler modules (not shown) and/or scheduler node 110 can collect and store capacity and transmission delay characteristics (e.g., buffered data, signal quality, throughput, guaranteed bit rate/non-guaranteed bit rate, busy hour, backhaul limitations/capacity, mobility, available spectrum, etc.) reported by wireless devices 102, 102A, 102B, 102C, RN 104 at DeNBs 106 and/or 108. DeNBs 106 and/or 108, via scheduler modules and/or scheduler node 110, can distribute wireless resources via a scheduling algorithm to wireless devices 102, 102A, 102B, 102C, RN 104 based on the collected characteristics, "relay" status, and/or CoMP type.

DeNBs 106 and 108 can comprise a processor and associated circuitry to execute or direct the execution of computer-readable instructions to obtain information. DeNBs 106 and/or 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. DeNBs 106 and/or 108 can receive instructions and other input at a user interface. Although only DeNBs 106, 108 are illustrated in FIGS. 1A and 1B, wireless devices 102, 102A, 102B, 102C, RN 104 can be in communication with a plurality of DeNBs. The plurality of DeNBs can be associated with different networks and can support different communication protocols and radio access technologies.

Controller node 112 can be any network node configured to communicate information and/or control information over communication system 100. Controller node 112 can be configured to transmit control information associated with a handover procedure. Controller node 112 can be a standalone computing device, computing system, or network component, and can be accessible, for example, by a wired or wireless connection, or through an indirect connection such as through a computer network or communication network. For example, controller node 112 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that controller node 112 is not limited to any specific technology architecture, such as LTE, and can be used with any network architecture and/or protocol.

Controller node 112 can comprise a processor and associated circuitry to execute or direct the execution of computer-readable instructions to obtain information. Controller node 112 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 112 can receive instructions and other input at a user interface.

Gateway node 114 can be any network node configured to interface with other network nodes using various protocols that communicate, route, and forward communication data addressed to wireless devices 102, 102A, 102B, 102C, RN 104. In addition, gateway node 114 can act as a mobility anchor for wireless devices 102, 102A, 102B, 102C, RN 104 during handovers between different frequencies and/or different radio access technologies supported by the same access node. Gateway node 114 can be a standalone computing device, computing system, or network component, and can be accessible, for example, by a wired or wireless connection, or through an indirect connection such as through a computer network or communication network. For example, gateway node 114 can include a Serving Gateway (SGW) and/or Public Data Network Gateway (PGW), etc. One of ordinary skill in the art would recognize that gateway node 114 is not limited to any specific technology architecture, such as LTE, and can be used with any network architecture and/or protocol.

Gateway node 114 can comprise a processor and associated circuitry to execute or direct the execution of computer-readable instructions to obtain information. Gateway node 114 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 114 can receive instructions and other input at a user interface.

Communication links 118, 118A, 118B, 120, 122, 124, 126, 128, 130, 132, 134, 136 can be wired or wireless communication links and use various communication protocols such as Internet, Internet Protocol ("IP"), LAN, optical networking, Hybrid Fiber Coax ("HFC"), telephony, T1, or some other communication format—including combinations, improvements, or variations thereof. Wireless communication links 118, 118A, 118B, 120, 122, 124, 126, 128, 130, 132, 134, 136 can comprise, for example, RF, microwave, infrared, or other similar signal, and can use a suitable communication protocol, for example, CDMA 1×RTT, GSM, WiMAX, UMTS, EV-DO, EV-DO rev. A, 3GPP LTE, HSDPA, IEEE 802.11, Wi-Fi, IrDA, or combinations thereof. Communication links 118, 118A, 118B, 120, 122, 124, 126, 128, 130, 132, 134, 136 can be a direct link or might include various equipment, intermediate components, systems, and networks.

Wireless communication links 118, 118A, 118B, 120, 122, 124, 126, 128, 130, 132, 134, 136 can comprise one or more logical channels, one or more transport channels, and one or more physical channels. A logical channel typically describes different flows of information, such as bearer data and/or signaling information, and can be organized differently for UL and DL portions of a communication link, such as, for example, communication links 118, 118A, 118B, 120, 122, 124, 126, 128, 130, 132, 134, 136. A transport channel can organize information, such as data packets, received from one or more logical channels for transmission over a communication link, and can define how and with what type of characteristics information is transferred by the physical channel. A physical channel can comprise, for example, a carrier frequency or a number of carrier frequencies in a communication link, and can provide a physical transmission medium for one or more transport channels.

Communication network 116 can be a wired and/or wireless communication network, and can comprise processing nodes, routers, gateways, and physical and/or wireless data links for carrying data among various network elements, including combinations thereof, and can include a Local-Area Network ("LAN"), a Wide-Area Network ("WAN"), and an internetwork (including the Internet). Communication network 116 can be capable of carrying data, for example, to support voice, push-to-talk, broadcast video, and data communications by a wireless device, such as, for example, wireless device 102, 102A, 102B, 102C, RN 104. Wireless network protocols can comprise CDMA 1×RTT, GSM, WiMAX, UMTS, EV-DO, EV-DO rev. A, 3GPP LTE, HSDPA, IEEE 802.11, Wi-Fi, IrDA, and combinations thereof. Wired network protocols that may be utilized by communication network 116 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 116 may also comprise additional base stations, controller nodes, telephony switches, internet routers, network gateways, computer systems, communication links, or some other type of communication equipment, and combinations thereof.

Figure 2:
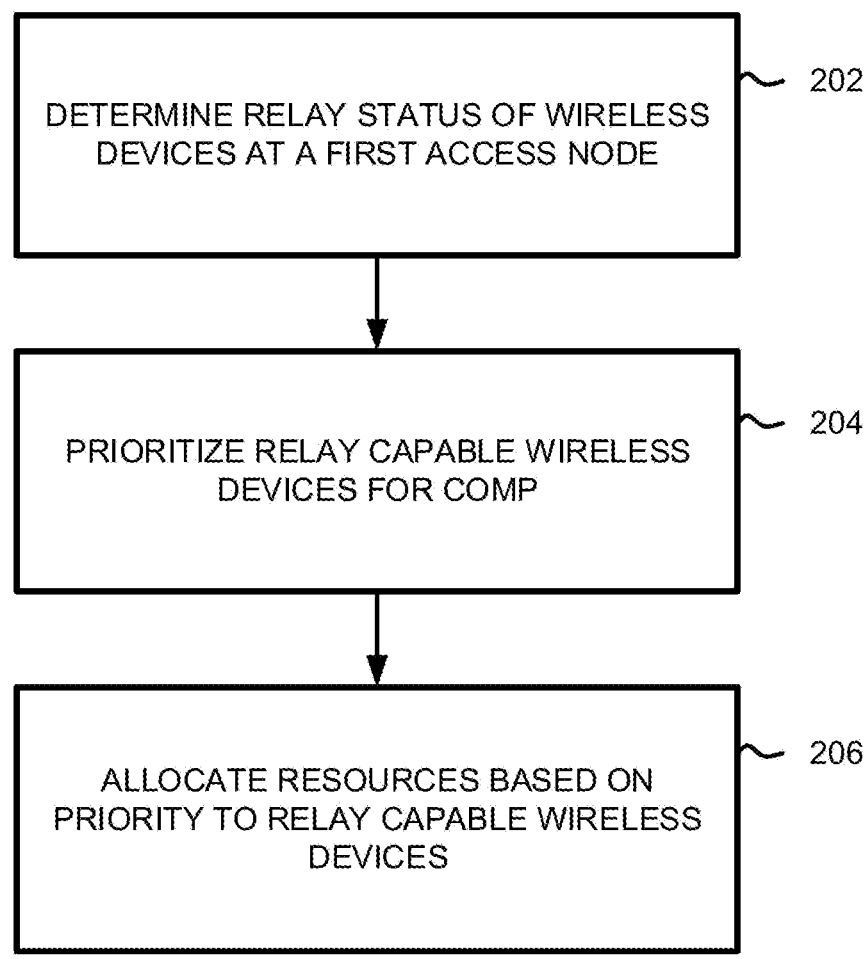
FIG. 2 illustrates an exemplary method for prioritizing wireless device selection for CoMP.

FIG. 2 illustrates an exemplary method for prioritizing wireless device selection for CoMP. The method will be discussed with reference to the exemplary communication system 100 illustrated in FIGS. 1A and 1B and the attach procedure illustrated in FIG. 3A. However, the method can be implemented with any suitable communication system. In addition, although FIG. 2 depicts steps performed in a particular order for purposes of illustration and discussion, the method discussed herein is not limited to any particular order or arrangement. One skilled in the art, using the disclosures provided herein, will appreciate that various steps of the method can be omitted, rearranged, combined and/or adapted in various ways.

Referring to FIG. 2, at step 202, a relay-capable status of a wireless device is determined at a first access node. For example, as illustrated in FIGS. 1A and 1B, wireless devices 102, 102A, 102B, 102C, RN 104 may be located at a cell-edge, "hotspot," and/or coverage "hole" of geographic areas 138, 140 of DeNBs 106 and/or 108. In one embodiment, wireless device 102A, 102C experiences reduced channel capacity, e.g., low SINR levels and/or "fading," resultant from co-channel interference and/or QoS degradation. DeNBs 106 and/or 108 may identify multiple relay-capable wireless devices 102, 102B, RN 104 located within a radio range 142, 144 of wireless device 102A, 102C and selects a relay-capable wireless device, e.g., RN 104, to function as a RN based on RSSI and/or RF parameters reported by relay-capable wireless devices 102, 102B, RN 104 at DeNB 106.

Figure 3A:
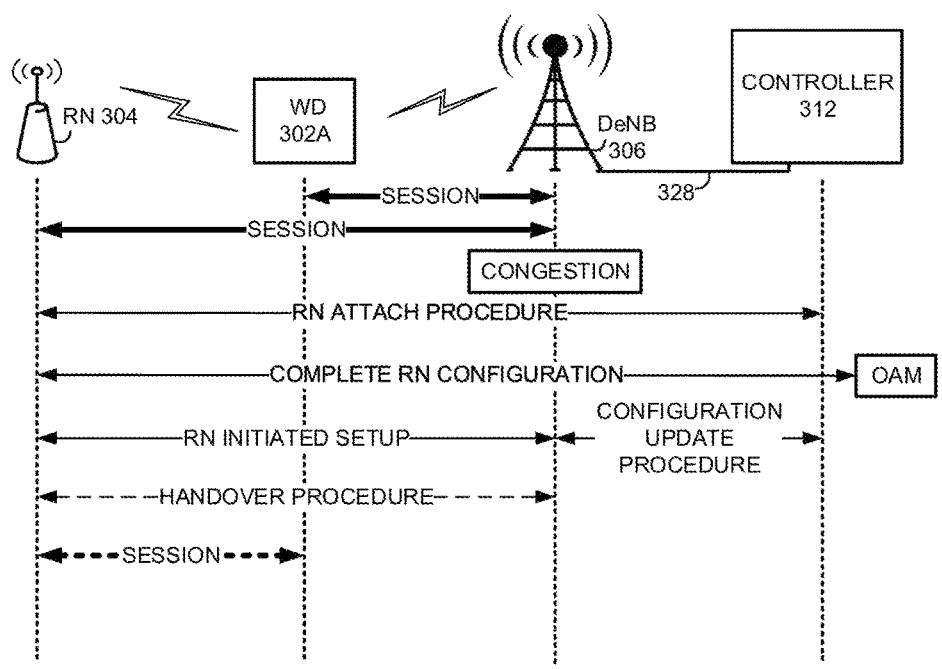
FIG. 3A illustrates an exemplary flow chart for selecting a relay capable wireless device to function as a Relay Node ("RN").

Referring to FIGS. 1A, 1B, and 3A, in one embodiment, an attach procedure may be performed for selected RNs 104, 304. For example, in the attach procedure, an RRC Connection setup may be performed between RNs 104, 304 and DeNBs 106, 306 and/or 108. At this time, RNs 104, 304 may transmit a RN capability indicator to DeNBs 106, 306 and/or 108 during the RRC Connection establishment. The RN capability indicator indicates whether RNs 104, 304 are relay-capable wireless devices or not. DeNBs 106, 306 and/or 108 may establish an interface, for example, an S1 interface, with controller node 112, 312 for signaling support of RNs 104, 304. Controller nodes 112, 312 may transmit a RN support indication to the DeNBs 106, 306 and/or 108 during, for example, the S1 interface setup. The RN support indication indicates whether controller nodes 112, 312 supports RNs 104, 304 or not. If controller nodes 112, 312 support RNs 104, 304, an Operations, Administration, and Management ("OAM") protocol may complete the RN configuration. Once RNs 104, 304 have been configured, DeNBs 106, 306 and/or 108 may initiate setup of bearers, e.g., S1/x2/Un bearers, and RNs 104, 304 may initiate setups of S1/x2/Un interfaces with DeNBs 106, 306 and/or 108. DeNBs 106, 306 and/or 108 may also initiate a RN reconfiguration procedure via RRC signaling for RN-specific parameters. After the RN reconfiguration update procedure is performed, DeNBs 106, 306 and/or 108 can update the Physical Cell Identity ("PCI") of RNs 104, 304. DeNBs 106, 306 and/or 108 may perform a handover procedure of, for example, wireless devices 102A, 102C, 302A from DeNBs 106, 306 and/or 108 to RNs 104, 304.

At step 204, wireless devices are prioritized for CoMP based on relay-capable status. For example, DeNBs 106, 306 and/or 108 may coordinate signal transmission/reception ("Tx/Rx") between DeNBs 106, 306 and/or 108 and wireless devices 102, 102A, 102B, 102C, RN 104, 302, RN 304 located in coordinating geographic areas 138, 140 of DeNBs 106, 306 and/or 108. CoMP coordination may be accomplished on the DL for scheduling and Tx and/or on the UL for Rx using CS/CB and/or JP CoMP schemes to coordinate resource usage and interference mitigation.

In one embodiment, wireless devices 102, 102A, 102B, 102C, RN 104, 302A, RN 304 may estimate Channel State Information ("CSI") and report to DeNBs 106, 306 and/or 108 via feedback channels 118, 118A, 118B, 120. DeNBs 106, 306 and/108 use the CSI and, for example, a distributed antenna array of DeNBs 106, 306 and/or 108 to implement CoMP Radio Resource Allocation ("RRA") strategies. CoMP RRA strategies may use Reference Signal Received Power ("RSRP"), RSSI, and/or RF measurements of wireless devices 102, 102A, 102B, 102C, RN 104, 302A, RN 304 located in coordinating geographic areas 138, 140 of DeNBs 106, 306 and/or 108. Clusters of wireless devices 102A, 102C, 302A may be jointly scheduled by a scheduling algorithm. Because CoMP DeNBs 106, 306 and/or 108 target wireless devices 102, 102A, 102B, 102C, RN 104, 302A, RN 304 with low SINR and/or RF parameters, which are often located at cell-edges, "hotspots," and/or coverage "holes" of geographical areas 138, 140 of DeNBs 106, 306 and/or 108, non-relay capable wireless devices 102A, 102C, 302A having similar SINR and/or RF parameters may be prioritized and/or jointly scheduled for CoMP over RNs 104, 304. For example, the CoMP RRA strategy of DeNBs 106, 306 and/or 108 may allocate a same number of resources, e.g., the next available PRB, wireless spectrum, etc., to RNs 104, 304, relay-capable wireless devices 102, 102B, and non-relay capable wireless devices 102A, 102C, 302A regardless of the relay "status" of the wireless device. Thus, end-users 102A, 102C, 302A of RNs 104, 304 may experience reduced channel capacity, e.g., low SINR levels, and/or QoS degradation.

In an exemplary embodiment, RNs 104, 304 are prioritized for assignment of CoMP. For example, wireless devices 102, 102A, 102B, 102C, RN 104, 302A, RN 304 located in coordinating geographic areas 138, 140 may report RSRP, RSSI, and/or RF parameters to DeNBs 106, 306 and/or 108. DeNBs 106, 306 and/or 108 may prioritize assignment of CoMP first to relay-capable wireless devices 102, 102B, RN 104, RN 304 (e.g., "candidate pool"). DeNBs 106, 306 and/or 108 may then dynamically select RNs 104, 304 from the candidate pool for CoMP.

At step 206, DeNBs 106, 306 and/or 108 can coordinate scheduling and allocate resources from DeNBs 106, 306 and/or 108 to RNs 104, 304 via scheduler 110 based on priority. Prioritizing wireless device selection for CoMP based on relay "status" reduces data traffic and load on both RF and backhaul networks while ensuring robustness and/or reliability for RNs 104, 304 and end-users 102A, 102C, 302A.

Figure 4:
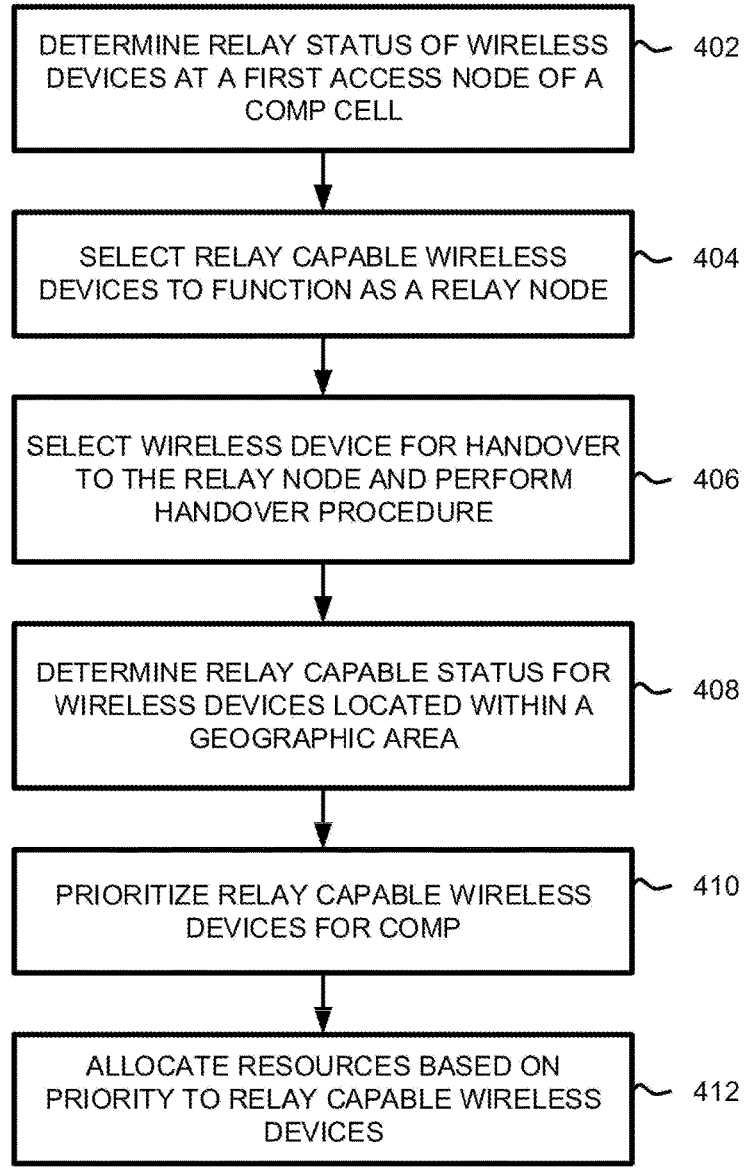
FIG. 4 illustrates another exemplary method for prioritizing wireless device selection for CoMP.

FIG. 4 illustrates another exemplary method for prioritizing wireless device selection for CoMP. The method will be discussed with reference to the exemplary communication system 100 illustrated in FIGS. 1A and 1B, the attach procedure illustrated in FIG. 3A, and the table for determining CoMP prioritization and assignment illustrated in FIG. 3B. In addition, although FIG. 4 depicts steps performed in a particularly order for purposes of illustration and discussion, the method discussed herein is not limited to any particular arrangement. One skilled in the art, using the disclosures provided herein, will appreciate that various steps of the method can be omitted, rearranged, combined and/or adapted in various ways.

Referring to FIG. 4, at steps 402 and 404, a relay-capable status of wireless devices 102, 102A, 102B, 102C, RN 104, 302, RN 304 may be determined and a relay-capable wireless device 102, 102B, RN 104, RN 304 may be selected to function as a RN. As illustrated in FIGS. 1A, 1B, and 3A, geographic areas 138, 140 of DeNBs 106, 108 and/or 306 define a CoMP cell. DeNBs 106, 306 and/or 108 can identify relay-capable wireless devices 102, 102B, RN 104, RN 304 within a radio range of end-users 102A, 102C, 302A and select a relay-capable wireless device 102, 102B, RN 104, RN 304 reporting a highest RSSI and/or RF parameters, to function as a RN (e.g., RNs 104, 304).

In an exemplary embodiment, illustrated in FIG. 3A, an attach procedure may be performed for selected RNs 104, 304. For example, in the attach procedure, an RRC Connection setup may be performed between RN s104, 304 and DeNBs 106, 306 and/or 108. At this time, RNs 104, 304 may transmit a RN capability indicator to DeNBs 106, 306 and/or 108 during the RRC Connection establishment. The RN capability indicator indicates whether RNs 104, 304 are relay capable wireless device or not. DeNBs 106, 306 and/or 108 may establish an interface, for example, an S1 interface, with controller nodes 112, 312 for signaling support of RNs 104, 304. Controller nodes 112, 312 may transmit a RN support indication to the DeNBs 106, 306 and/or 108 during, for example, the S1 interface setup. The RN support indication indicates whether controller nodes 112, 312 support RNs 104, 304 or not. If controller nodes 112, 312 support RNs 104, 304, an Operations, Administration, and Management ("OAM") protocol may complete the RN configuration. Once RNs 104, 304 have been configured, DeNBs 106, 306 and/or 108 may initiate setup of bearers, e.g., S1/x2/Un bearers, and RNs 104, 304 may initiate setups of S1/x2/Un interfaces with DeNBs 106, 306 and/or 108. DeNBs 106, 306 and/or 108 may also initiate a RN reconfiguration procedure via RRC signaling for RN-specific parameters. After the RN reconfiguration update procedure is performed, DeNBs 106, 306 and/or can update the Physical Cell Identity ("PCI") of RNs 104, 304.

At step 406, DeNBs 106, 306 and/or 108 may perform a handover procedure of end-users 102A, 102C, 302A from DeNBs 106, 306 and/or 108 to RNs 104, 304 for load-balancing. For example, DeNBs 106, 306 and/or 108 may spread user traffic across radio resources to provide end-user 102A, 102C, 302A QoS and performance, while simultaneously optimizing network 116 capacity. In selecting end-users 102A, 102C, 302A for handover from DeNBs 106, 306 and/or 108 to RNs 104, 304, DeNBs 106, 306 and/or 108 consider the following factors: end-user 102A, 102C, 302A measurement reports of DeNBs 106, 306, and/or 108 and RSSI and RF parameters of RNs 104, 304; end-user 102A, 102C, 302A current SINR ratio; loading conditions of DeNBs 106, 306, and/or 108 and RNs 104, 304; end-user 102A, 102C, 302A QoS/application profile; mobility of RNs 104, 304 and end-users 102A, 102C, 302A. These factors may also be used for prioritizing selected RNs 104, 304 for CoMP.

At step 408, DeNBs 106, 306, and/or 108 may determine a relay-capable status (e.g., based on the attach procedure illustrated in FIG. 3A) for wireless devices 102, 102A, 102B, 102C, RN 104, 302A, RN 306 located within geographic areas 138, 140 of DeNBs 106, 108, 306. Alternatively, network 116 is aware of the relay-capable status of each wireless device 102, 102A, 102B, 102C, RN 104, 302A, RN 306.

At step 410, wireless devices 102, 102A, 102B, 102C, RN 104, 302A, RN 304, located within the geographic areas 138, 140 of DeNBs 106, 108, 306, are prioritized for CoMP based on a relay-capable status. For example, wireless devices 102, 102A, 102B, 102C, RN 104, 302A, RN 304 can estimate Channel State Information ("CSI") and report the estimated CSIs to DeNBs 106, 306 and/or 108 via feedback channels 118, 118A, 118B, 120. DeNBs 106, 306, and/or 108 leverage the CSI and distributed antenna arrays of DeNBs 106, 306, and/or 108 to apply different CoMP RRA strategies, e.g., based on RSRP, RSSI, and/or RF parameters reported by wireless devices 102, 102A, 102B, 102C, RN 104, 302A, RN 304.

In one scenario, CoMP DeNBs 106, 306 and/or 108 can jointly schedule clustered wireless devices 102A, 102C, 302A using CoMP RRA strategies. In another embodiment, CoMP DeNBs 106, 306 and/or 108 target wireless devices 102, 102A, 102B, 102C, RN 104, 302A, RN 304 with reduced channel capacity, e.g., low SINR levels, and/or QoS degradation, which are often located at cell-edges, "hotspots", or coverage "holes" of geographical areas 138, 140 of DeNBs 106, 306 and/or 108. Because of this, non-relay capable wireless devices 102A, 102C, 302A having low SINR levels and/or QoS degradation, may be prioritized for CoMP over RNs 104, 304.

In another scenario, DeNBs 106, 306 and/or 108 via scheduler 110, for RRA purposes, may treat non-relay capable wireless devices 102A, 102C, 302A, relay-capable wireless devices 102, 102B, RN 104, RN 304, and RNs 104, 304 reporting similar RSRP, RSSI, and/or RF parameters the same. In other words, the CoMP RRA strategy of DeNBs 106, 306 and/or 108 may be to allocate a same number of resources, e.g., the next available PRB, wireless spectrum, etc., to wireless devices 102, 102A, 102B, 102C, RN 104, 302A, RN 304 located within the geographical areas 138, 140 of CoMP DeNBs 106, 306, and/or 108 regardless of relay-capable status. Thus, end-users 102A, 102C, 302A of RNs 104, 304 may continue to experience reduced channel capacity, e.g., low SINR levels, and/or QoS degradation.

In an exemplary embodiment, RNs 104, 304 can be prioritized for CoMP based on a relay-capable status. For example, based on the relay capable status of wireless devices 102, 102A, 102B, 102C, RN 104, 302A, RN 304 determined at Step 408, network 116 may "flag" relay-capable wireless devices 102, 102B, RN 104, RN 304 as candidates for CoMP. In other words, network 116 may be configured to "filter" the candidate pool 102, 102A, 102B, 102C, RN 104, 302A, RN 304 by prioritizing relay-capable wireless devices 102, 102B, RN 104, RN 304 for CoMP. CoMP DeNBs 106, 306 and/or 108 may then dynamically select only RNs 104, 304 from the candidate pool of relay-capable wireless devices 102, 102B, RN 104, RN 304 for CoMP.

In another exemplary embodiment, illustrated in FIG. 3B, CoMP DeNBs 106, 306 and/or 108 may "flag" RNs B and E as candidates for CoMP. CoMP DeNBs 106, 306, and/or 108 may determine a number of end-users, for example, 102A, 102C, 302A, connected to RNs B and E. For example, as illustrated in FIG. 3B, RN B has two end-users and RN E has three end-users. Assuming a maximum CoMP size is a number of end-users plus one (e.g., the RN), CoMP DeNBs 106, 306, and/or 108 may prioritize RNs B, E for CoMP based on the maximum CoMP size (assuming RNs B and E have similar RSSI and/or RF parameters). Because RN E has a maximum CoMP size of four, RN E is prioritized over RN B, which has a maximum CoMP size of three. In another embodiment, if, for example, CoMP DeNBs 106, 306, and/or 108 can support a CoMP size of three, but not four, then RN B may be prioritized over RN E.

At step 412, DeNBs 106, 306 and/or 108 may use a CoMP RRA strategy to allocate resources (e.g., using CS/CB and/or JP CoMP) to prioritized RNs 104, 304 located within the geographical area 138, 140 of DeNBs 106, 306 and/or 108. For example, scheduler 110 and/or a scheduler module (not shown) located at DeNBs 106, 306, and/or 108 can select a Modulation and Coding Scheme ("MCS") based on Channel Quality Indicators ("CQIs") reported by RNs 104, 304 and transmit data packets to RNs 104, 304 based on the selected MCS and using CS/CB and/or JP CoMP. Resources may then be allocated to relay-capable wireless devices 102, 102B and/or non-relay capable wireless devices 102A, 102C, 302A based on reported RSRP, RSSI, and/or RF parameters or the factors as set forth at step 406.

Figure 5:
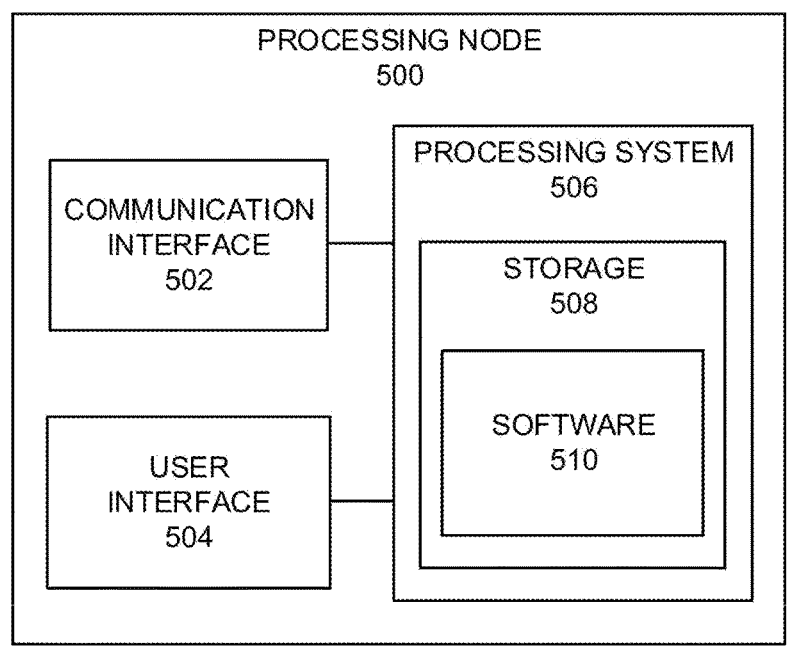
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include DeNBs 106, 108, 306, RNs 104, 304, gateway node 114, and controller node 112, 312. Processing node 500 can also be an adjunct or component of a network element, such as an element of DeNBs 106, 108, 306, RNs 104, 304, schedulers modules/nodes 110, gateway node 114, and controller node 112, 312. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for prioritizing wireless device users for joint processing, the method comprising:
    locating multiple relay-capable wireless devices at a coverage hole of a geographic area of a first access node;

prioritizing, based on a number of end-users, at least one relay-capable wireless device, of the located multiple relay-capable wireless devices, that supports the number of end users; and communicating with the prioritized at least one relay-capable wireless device by combining a data signal from the prioritized at least one relay-capable wireless device received at a first antenna array of the first access node operating using a first network and received at a second antenna array of a second access node operating using a second network.

2. The method of claim 1, wherein the first antenna array is configured to communicate with a different frequency band from the second antenna array.

3. The method of claim 1, wherein the at least one relay-capable wireless device is selected based on a reported RSRP, RSSI, and RF parameter.

4. The method of claim 3, wherein a radio range of the at least one relay-capable wireless device is configured to expand a coverage area of the first or second access node.

5. The method of claim 4, wherein resources are scheduled between the at least one relay-capable wireless device and the first or second access node using coordinated scheduling and beamforming Coordinated Multipoint ("CoMP").

6. The method of claim 4, wherein resources are scheduled between the at least one relay-capable wireless device and the first or second access node using joint processing Coordinated Multipoint ("CoMP").

7. The method of claim 6, wherein data packets are transmitted to the at least one relay-capable wireless device using a Modulation and Coding Scheme ("MCS") based on a Channel Quality Indicator ("QCI") reported by the at least one relay-capable wireless device.

8. The method of claim 6, wherein data packets are scheduled to the at least one relay-capable wireless device based on a load at the relay-capable wireless device and an application profile of the end-users.

9. The method of claim 1, wherein the at least one relay-capable wireless device is selected based on a loading condition.

10. A system for prioritizing wireless device users for joint processing, the system comprising:
a network node comprising a processor, the network node configured to:
locate multiple relay-capable wireless devices at a coverage hole of a geographic area of a first access node;
prioritize, based on a number of end-users, at least one relay-capable wireless device, of the located multiple relay-capable wireless devices, that supports the number of end users; and
communicate with the prioritized at least one relay-capable wireless device by combining a data signal from the prioritized at least one relay-capable wireless device received at a first antenna array of the first access node operating using a first communication network and received a second antenna array of a second access node operating using a second communication network.

11. The system of claim 10, wherein the first antenna array is configured to communicate with a different frequency band from the second antenna array.

12. The system of claim 10, wherein the at least one relay-capable wireless device is selected based on a reported RSRP, RSSI, and RF parameter.

13. The system of claim 12, wherein a radio range of the at least one relay-capable wireless device is configured to expand a coverage area of the first or second access node.

14. The system of claim 13, wherein resources are scheduled between the at least one relay-capable wireless device and the first or second access node using coordinated scheduling and beamforming Coordinated Multipoint ("CoMP").

15. The system of claim 13, wherein resources are scheduled between the at least one relay-capable wireless device and the first or second access node using joint processing Coordinated Multipoint ("CoMP").

16. The system of claim 15, wherein data packets are transmitted to the at least one relay-capable wireless device using a Modulation and Coding Scheme ("MCS") based on a Channel Quality Indicator ("QCI") reported by the at least one relay-capable wireless device.

17. The system of claim 15, wherein data packets are scheduled to the at least one relay-capable wireless device based on a load at the relay-capable wireless device and an application profile of the end-users.

18. The system of claim 10, wherein the at least one relay-capable wireless device is selected based on a loading condition.

19. A method for prioritizing wireless device users for joint processing, the method comprising:
locating multiple relay-capable wireless devices at a coverage hole of a geographic area of a first access node;
prioritizing, based on a number of end-users, at least one relay-capable wireless device, of the located multiple relay-capable wireless devices, that supports the number of end users; and
communicating with the prioritized at least one relay-capable wireless device by combining a data signal from the prioritized at least one relay-capable wireless device received at a first antenna array of the first access node operating using a first radio access technology ("RAT") and at a second antenna array of a second access node operating using a second RAT.

20. The method of claim 19, wherein the first antenna array is configured to communicate with a different frequency band from the second antenna array.

* * * * *